(12) United States Patent  
Uryu et al.

(10) Patent No.: US 9,762,050 B2  
(45) Date of Patent: Sep. 12, 2017

(54) MOTOR DRIVE DEVICE

(71) Applicant: DENSO CORPORATION, Kariya, Aichi-pref. (JP)

(72) Inventors: Nobuhiko Uryu, Kariya (JP); Naoki Matsuda, Handa (JP)

(73) Assignee: DENSO CORPORATION, Kariya (JP)

( * ) Notice: Subject to any disclaimer, the term of this patent is extended or adjusted under 35 U.S.C. 154(b) by 232 days.

(21) Appl. No.: 13/965,266

(22) Filed: Aug. 13, 2013

(65) Prior Publication Data

US 2014/0055887 A1    Feb. 27, 2014

(30) Foreign Application Priority Data

Aug. 27, 2012 (JP) ................... 2012-186572

(51) Int. Cl.
*H02H 7/122* (2006.01)
*B62D 5/04* (2006.01)

(52) U.S. Cl.
CPC ......... *H02H 7/1222* (2013.01); *B62D 5/0403* (2013.01); *B62D 5/046* (2013.01); *B62D 5/0484* (2013.01); *B62D 5/0487* (2013.01)

(58) Field of Classification Search
CPC ... H02H 7/1222; B62D 5/0487; B62D 5/0403
See application file for complete search history.

(56) References Cited

U.S. PATENT DOCUMENTS

| | | | |
|---|---|---|---|
| 8,436,568 B2* | 5/2013 | Mukai et al. | 318/490 |
| 8,649,159 B2* | 2/2014 | Fujita et al. | 361/622 |
| 2011/0163708 A1 | 7/2011 | Mukai et al. | |
| 2011/0285336 A1* | 11/2011 | Fujita | H01L 25/072 318/400.27 |
| 2011/0290580 A1 | 12/2011 | Mukai et al. | |

OTHER PUBLICATIONS

Office Action (2 pages) dated Jun. 17, 2014, issued in corresponding Japanese Application No. 2012-186572 and English translation (2 pages).
Uryu, et al., U.S. Appl. No. 13/965,301, filed Aug. 13, 2013.

* cited by examiner

*Primary Examiner* — Thienvu Tran
*Assistant Examiner* — Tien Mai
(74) *Attorney, Agent, or Firm* — Nixon & Vanderhye, P.C.

(57) ABSTRACT

A motor drive device for driving a motor, which has a plurality of winding pairs, includes a plurality of inverter units for the plurality of winding pairs. The inverter units are coupled in parallel to a power source. A plurality of capacitors provided for the plurality of inverter units, and a plurality of power relays are disposed between the power supply and the inverter units. In particular, a power relay is provided for each of the inverter units. A control unit detects a short failure of the power relay, and simultaneously turns ON the power relays that do not have a short failure. In such manner, damage to the power relays as well as damage to other electronic components of the motor driver device due to a large electric current is prevented.

5 Claims, 4 Drawing Sheets

MOTOR DRIVE DEVICE

CROSS-REFERENCE TO RELATED APPLICATION

This application is based on and claims the benefit of priority of Japanese Patent Application No. 2012-186572 filed on Aug. 27, 2012, the disclosure of which is incorporated herein by reference.

TECHNICAL FIELD

The present disclosure generally relates to a motor drive device for driving a motor, which has a plurality of winding pairs.

BACKGROUND

A motor drive device drives a motor that has a plurality of winding pairs. If a failure occurs in a portion of one winding pair or in one "system" that is formed as a combination of one winding pair and an inverter or the like corresponding thereto, the motor continues to be driven by stopping the system that has the failure (i.e., a failed system) and by operating a system that is normal or, in other words, has no failure (i.e., a normal system). Such a motor drive device is disclosed in JP-A-2011-142744 (a patent document 1). Patent document 1 also discloses performing a failure detection, which detects a failure of the motor drive device, before starting an operation of the motor drive device.

When the failure detection is performed for each of the plurality of systems, as described in the patent document 1, a failure detection end time may be different from system to system. In such a case, if a power supply time for starting a power supply is different from system to system (i.e., from one winding pair to the other), during a period in which the power supply is provided for only a portion of the plurality of systems, a rotation torque generated by the portion of the plurality of systems may be different from a predetermined value because of the different failure detection end times of the systems. Therefore, to avoid a torque shortage period in which the rotation torque is different from the predetermined value, patent document 1 discloses the power supply for all winding pairs is started by waiting for a completion of failure detection for all of the plurality of systems.

Further, in patent document 1, a short failure (i.e., a short circuit) of a power relay is detected from system to system in order to turn ON the power relay when no short failure is detected in each of the power relays. Therefore, when a short failure detection time is different from system to system, a power relay turning ON time is also different from system to system.

Further, there may be a case in which a capacitor is disposed in association with an inverter. In such a case, if the power relay turning ON time is different from system to system, the capacitor of the system that has a power relay turning ON time set before other systems has an electric charge stored therein. Such an electric charge in one capacitor may be discharged as a large electric current through a low impedance current path to other systems that have a subsequent power relay turning ON time, when the power relay turning ON time arrives for the other systems with the subsequent time. Such a large electric current may damage a power relay, an inverter, and/or a substrate of the other systems in which the power relay is turned ON later.

SUMMARY

In an aspect of the present disclosure, the motor drive device drives a motor having a plurality of winding pairs. The motor drive device includes an inverter unit, a capacitor, a power relay, and a control unit. The inverter unit is provided for each of the plurality of winding pairs, and plural inverter units are connected to a power supply in parallel with each other. Multiple capacitors are coupled to the inverter units, such that each inverter unit has at least one capacitor. The power relay is disposed between the power supply and the inverter unit, and is provided for each of the inverter units. The control unit has a drive control unit and a failure detection unit. The drive control unit controls the drive of the inverter unit and the power relay. The failure detection unit detects a short failure (i.e., a short circuit) of the power relays. Further, the drive control unit simultaneously turns ON the power relays that are detected by the failure detection unit as not having a short failure.

In such manner, the power relays that do not have a short failure are turned ON at the same time. Accordingly, corresponding capacitors are not charged and a discharge of a large electric current from the capacitors to other parts of a circuit through a low impedance current path is prevented. Thus, a failure and/or damage of the motor drive device is prevented.

Further, since the plural inverter units are connected to the power supply in parallel with each other, a rush electric current flowing from the power supply to each of the inverter units is reduced by turning ON the power relays at the same time. Therefore, a switching element of the inverter unit may be configured to be, for example, a component that has a low electric current tolerance value, which reduces a total volume of the motor drive device.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

A motor drive device and an electric power steering apparatus, which uses the motor drive device are described in the following with reference to the drawings.

Figure 1:
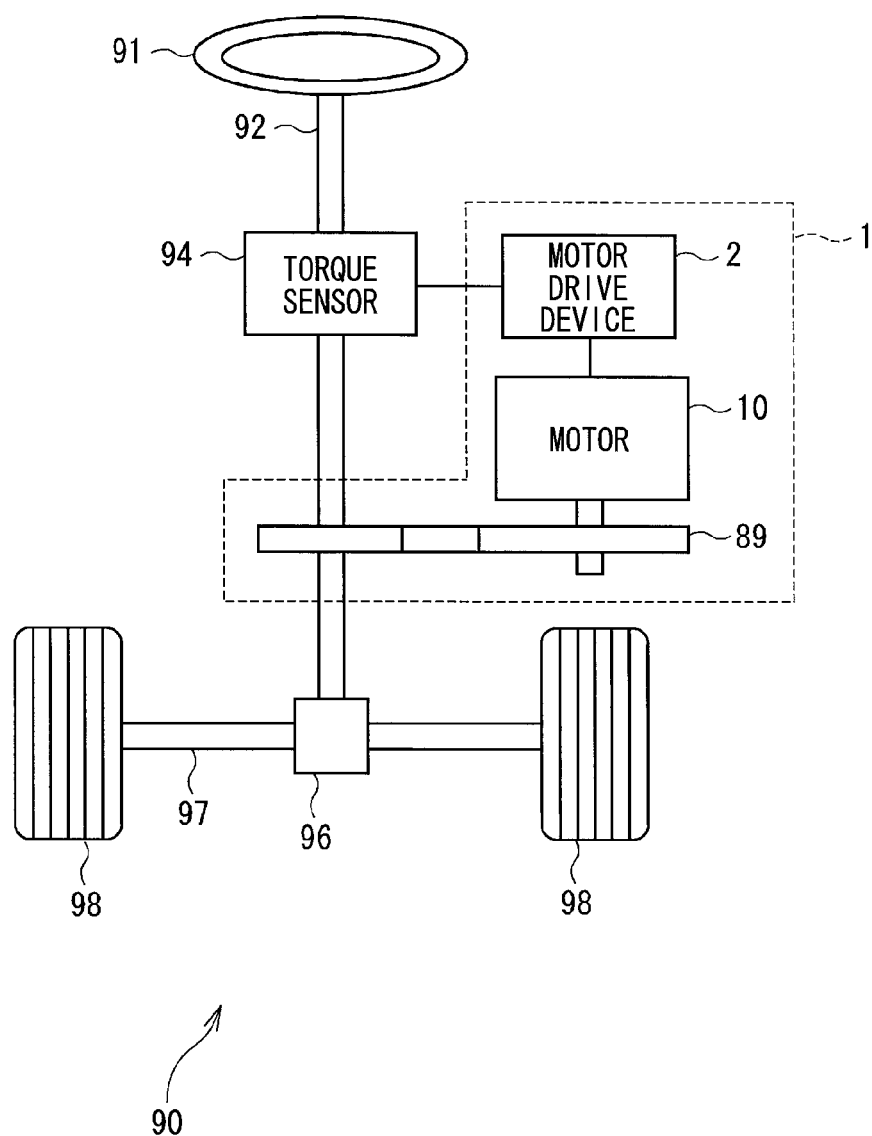
FIG. 1 is an illustration of an electric power steering apparatus.

With reference to FIG. 1, a motor drive device 2 of the present disclosure is applied to an electric power steering apparatus 1.

A steering system 90 includes the electric power steering apparatus 1, a steering wheel 91, and a steering shaft 92. The steering wheel 91 operated by a driver of a vehicle is connected to the steering shaft 92. A pinion gear 96 is provided on one end of the steering shaft 92. The pinion gear 96 is engaged with a rack axis 97. On both ends of the rack axis 97, a pair of tires (i.e., wheels) 98 are disposed in a rotatable manner through a tie rod or the like. In such manner, when the steering wheel 91 is rotated by the driver, the steering shaft 92 is rotated, and such rotation is converted to a linear movement of the rack axis 97 by the pinion gear 96, and the tires 98 on the right and left sides are steered by an angle that accords with the linear movement of the rack axis 97.

The steering shaft 92 has a torque sensor 94 for detecting a steering torque Tq applied to the steering wheel 91.

The electric power steering apparatus 1 includes the motor drive device 2, a motor 10 that outputs a torque for assisting a steering operation of the steering wheel 91 by the driver, and a gear 89. The motor 10 is a three-phase brush-less motor that provides a forward-reverse rotation to the gear 89. The gear 89 reduces a rotation number of the motor 10 and transmits the rotation to the steering shaft 92. In such manner, the electric power steering apparatus 1 transmits, to the steering shaft 92, an assisting torque that is in accordance with a steering direction and the steering torque Tq of the steering wheel 91.

The motor 10 has a stator, a rotor, and a shaft (all of which not illustrated). The rotor is a member that rotates with the shaft, and has permanent magnets, which serves as a magnetic pole, disposed on a surface. The stator has protrusions that protrude in radially-inward directions at every predetermined angle, on which the following coils are wound, which are a U2 coil 11, a V1 coil 12, a W1 coil 13, a U2 coil 14, a V2 coil 15 and a W2 coil 16 (see FIG. 2). The U2 coil 11, the V1 coil 12 and the W1 coil 13 are, for example, A-connected to form a first winding pair 17. Further, the U2 coil 14, the V2 coil 15 and the W2 coil 16 are, for example, A-connected to form a second winding pair 18. The first winding pair 17 and the second winding pair 18 are provided in parallel with each other in terms of connection to a battery 50 that serves as a power supply. Further, the first winding pair 17 and the second winding pair 18 correspond to a "winding pair."

Figure 2:
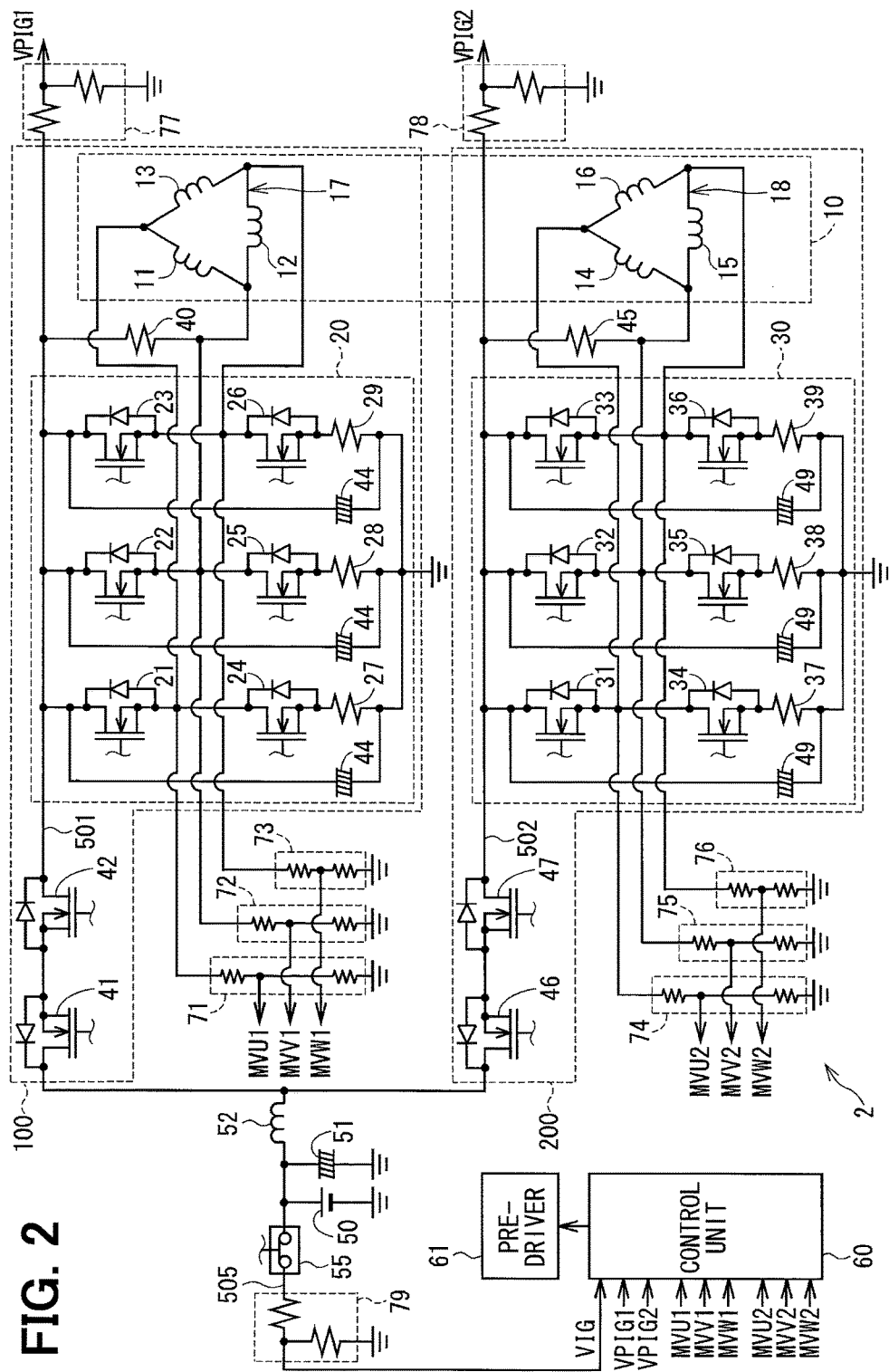
FIG. 2 is a diagram of a motor drive device of the electric power steering apparatus.

With reference to FIG. 2, the motor drive device 2 includes a first inverter unit 20 and a second inverter unit 30, which serve as an inverter unit, a first power relay 41 and a second power relay 46, which serve as a power relay, a first reverse connection protection relay 42 and a second reverse connection protection relay 47, which serve as a reverse connection protection relay, as well as a control unit 60.

The first inverter unit 20, the first power relay 41 and the first reverse connection protection relay 42 are provided in a corresponding manner for the first winding pair 17 of the motor 10. Further, the second inverter unit 30, the second power relay 46 and the second reverse connection protection relay 47 are provided in a corresponding manner for the second winding pair 18 of the motor 10. In the present embodiment, a "system" is defined as a combination that combines an inverter unit and other components with a corresponding winding pair. In particular, a system 100 combines the first winding pair 17, the first inverter unit 20, the first power relay 41, and the first reverse connection protection relay 42. Also, a system 200 combines the second winding pair 18, the second inverter unit 30, the second power relay 46, and the second reverse connection protection relay 47.

The first inverter unit 20 is a three-phase inverter, in which six switching elements 21, 22, 23, 24, 25, 26 are provided to form a bridge for switching a power supply for the U2 coil 11, the V1 coil 12, and the W1 coil 13 of the first winding pair 17.

The second inverter unit 30 is a three-phase inverter, in which six switching elements 31, 32, 33, 34, 35, 36 are provided to form a bridge for switching a power supply for the U2 coil 14 of, the V2 coil 15, and the W2 coil 16 of the second winding pair 18.

In the present embodiment, MOSFET (metal-oxide-semiconductor field-effect transistor), which is a kind of a field effect transistor, is used as the switching elements 21 to 26, 31 to 36. The switching elements 21 to 26, 31 to 36 are therefore designated as MOS 21 to 26 and MOS 31 to 36 in the following description. Further, MOS may be associated with a corresponding phase, a corresponding system, or a corresponding position arrangement, such as "U1 phase high-side MOS 21" or the like.

MOS 21 of the first inverter unit 20 has its drain connected to a first PIG line 501, which is described later, and has its source connected to the drain of MOS 24. The source of MOS 24 is grounded through a shunt resistor 27. The connection point between the source of MOS 21 and the drain of MOS 24 is connected to one end of the U2 coil 11.

MOS 22 has its drain connected to the first PIG line 501, and has its source connected to the drain of MOS 25. The source of MOS 25 is grounded through a shunt resistor 28. The connection point between the source of MOS 22 and the drain of MOS 25 is connected to one end of the V1 coil 12.

MOS 23 has its drain connected to the first PIG line 501, and has its source connected to the drain of MOS 26. The source of MOS 26 is grounded through a shunt resistor 29. The connection point between the source of MOS 23 and the drain of MOS 26 is connected to one end of the W1 coil 13.

MOS 31 of the second inverter unit 30 has its drain connected to a second PIG line 502, which is described later, and has its source connected to the drain of MOS 34. The source of MOS 34 is grounded through a shunt resistor 37. The connection point between the source of MOS 31 and the drain of MOS 34 is connected to one end of the U2 coil 14.

MOS 32 has its drain connected to the second PIG line 502, and has its source connected to the drain of MOS 35. The source of MOS 35 is grounded through a shunt resistor 38. The connection point between the source of MOS 32 and the drain of MOS 35 is connected to one end of the V2 coil 15.

MOS 33 has its drain connected to the second PIG line 502, and has its source connected to the drain of MOS 36. The source of MOS 36 is grounded through a shunt resistor 39. The connection point between the source of MOS 33 and the drain of MOS 36 is connected to one end of the W2 coil 16.

The shunt resistors 27 to 29, 37 to 39 are used for the detection of an electric current supplied to each phase. The control unit 60 detects the electric current of the U2 coil 11, the V1 coil 12, and the W1 coil 13 based on a voltage between both ends of the shunt resistors 27 to 29, and detects an electric current of the U2 coil 14, the V2 coil 15, and the W2 coil 16 based on a voltage between both ends of the shunt resistors 37 to 39.

The first power relay 41 is disposed at a position between the battery 50 and the first inverter unit 20. The first power relay 41 is a MOSFET, which is similar to MOS, and is disposed with its drain connected to a side towards the battery 50 and with its source connected to a side towards the first inverter unit 20.

The first reverse connection protection relay 42 is disposed at a position between the first power relay 41 and the first inverter unit 20. The first reverse connection protection relay 42 is a MOSFET, which is similar to MOS, and is disposed with its source connected to a side towards the first power relay 41 and with its drain connected to a side towards the first inverter unit 20. Further, the first reverse connection protection relay 42 has its parasitic diode disposed reversely relative to a direction of a parasitic diode of the first power relay 41. In such manner, an electric current flowing in both directions is intercepted, thereby protecting the motor drive device 2 when a polarity of the battery 50 or a polarity of a first capacitor 44 is reversely arranged.

Further, when a failure has occurred in the first system 100, the first power relay 41 and the first reverse connection protection relay 42 are turned OFF by the control unit 60, which places the first power relay 41 and the first reverse connection protection relay 42 in an open state, to prevent the battery 50 from providing power to the first inverter unit 20.

The second power relay 46 is disposed at a position between the battery 50 and the second inverter unit 30. The second power relay 46 is a MOSFET which is similar to MOS, and is disposed with its drain connected to a side towards the battery 50 and with its source connected to a side towards the second inverter unit 30.

The second reverse connection protection relay 47 is disposed at a position between the second power relay 46 and the second inverter unit 30. The second reverse connection protection relay 47 is a MOSFET, which is similar to MOS, and is disposed with its source connected to a side towards the second power relay 46 and with its drain connected to a side towards the second inverter unit 30. Further, the second reverse connection protection relay 47 has its parasitic diode disposed reversely relative to a direction of a parasitic diode of the second power relay 46. In such manner, an electric current in both directions is intercepted, thereby protecting the motor drive device 2 when a polarity of the battery 50 or a polarity of a second capacitor 49 is reversely arranged.

Further, when a failure has occurred in the second system 200, the second power relay 46 and the second reverse connection protection relay 47 are turned OFF by the control unit 60, which places the second power relay 46 and the second reverse connection protection relay 47 in an open state, to prevent the battery 50 from providing power to the second inverter unit 30.

Further, in the present embodiment, when MOS 21 to 26, 31 to 36, the power relays 41, 46, and the reverse connection protection relays 42, 47 are turned ON, they all are in a closed state (i.e., in a conductive state), and when they are turned OFF, they all are in an open state (i.e., in a non-conductive state).

The first capacitor 44 is connected in parallel with the first inverter unit 20. The first capacitor 44 of the present embodiment is an electrolytic capacitor, and assists a power supply for the first inverter unit 20 and removes noise components such as a surge current by storing an electric charge.

Similarly, the second capacitor 49 is connected in parallel with the second inverter unit 30. The second capacitor 49 of the present embodiment is an electrolytic capacitor, and the capacitor 49 assists a power supply for the second inverter unit 30, and removes noise components such as a surge current by storing an electric charge. Further, the first capacitor 44 and the second capacitor 49 may correspond to a "capacitor" in the claims.

The battery 50 is a direct current power supply, and the power supply voltage is 12V in the present embodiment. The battery 50 is connected to the first power relay 41 and to the second power relay 46 through a choke coil 52 that forms a filter circuit together with a third capacitor 51.

Further, the battery 50 is connected to the control unit 60 through an ignition switch 55 that is disposed in parallel with the first power relay 41 and the second power relay 46.

In the following description, a line on which the first power relay 41 is provided is designated as the "first PIG line 501," a line on which the second power relay 46 is provided is designated as the "second PIG line 502," and a line on which the ignition switch 55 is provided is designated as an "IG line 505."

The control unit 60 is provided as a normal computer, and includes a CPU, a ROM, an input/output, and a bus line for connecting these components together with other parts. The control unit 60 controls, through a pre-driver 61, a power supply for the first winding pair 17 by controlling drive of the first inverter unit 20, and a power supply for the second winding pair 18 by controlling drive of the second inverter unit 30. Further, the control unit 60 controls drive of the power relays 41, 46, and drive of the reverse connection protection relays 42, 47 through the pre-driver 61. Further, a control line from the pre-driver 61 is omitted for the clarity of the illustration.

The control unit 60 acquires a U1 terminal voltage MVU1 through a voltage dividing resistor 71 that is connected to one end of the U2 coil 11, and acquires a V1 terminal voltage MVV1 through a voltage dividing resistor 72 that is connected to one end of the V1 coil 12, and acquires a W1 terminal voltage MVW1 through a voltage dividing resistor 73 that is connected to one end of the W1 coil 13. Further, one end of the V1 coil 12 is connected to a first pull-up resistor 40 that is connected to the first PIG line 501. The resistance value of the first pull-up resistor 40 and the voltage dividing resistors 71, 72, 73 are the same. Specifically, the resistance value of the first pull-up resistor 40 is equal to a sum of the resistance values of the voltage dividing resistor 71, and to a sum of the resistance value of the voltage dividing resistor 72, and to a sum of the resistance value of the voltage dividing resistor 73, where the resistance value of the voltage dividing resistors 71, 72, and 72 are equal to one another.

Further, the control unit 60 acquires a U2 terminal voltage MVU2 through a voltage dividing resistor 74 that is connected to one end of the U2 coil 14, and acquires a V2 terminal voltage MVV2 through a voltage dividing resistor 75 that is connected to one end of the V2 coil 15, and acquires a W2 terminal voltage MVW2 through a voltage dividing resistor 76 that is connected to one end of the W2 coil 16. Further, one end of the V2 coil 15 is connected to a second pull-up resistor 45 that is connected to the second PIG line 502. The resistance value of the second pull-up resistor 45 and the voltage dividing resistors 74, 75, 76 are the same. In particular, the resistance value of the second pull-up resistor 45 is equal to a sum of the resistance value of the voltage dividing resistor 74, and to a sum of the resistance value of the voltage dividing resistor 75, and to a sum of the resistance value of the voltage dividing resistor 76, where the resistance value of the voltage dividing resistors 74, 75, 76 are equal to one another.

The control unit 60 acquires an after-first-relay voltage VPIG1 of the first PIG line 501 through a voltage dividing resistor 77 that is provided on the first PIG line 501, and acquires an after-second-relay voltage VPIG2 of the second PIG line 502 through a voltage dividing resistor 78 that is provided on the second PIG line 502, and acquires an IG voltage VIG of the IG line 505 through a voltage dividing resistor 79 that is provided on the IG line 505.

The control unit 60 detects a failure of the electric power steering apparatus 1 based on the terminal voltages MVU1, MVV1, MVW1, MVU2, MVV2, MVW2, and the after-relay voltages VPIG1, VPIG2, and the IG voltage VIG.

Figure 3:
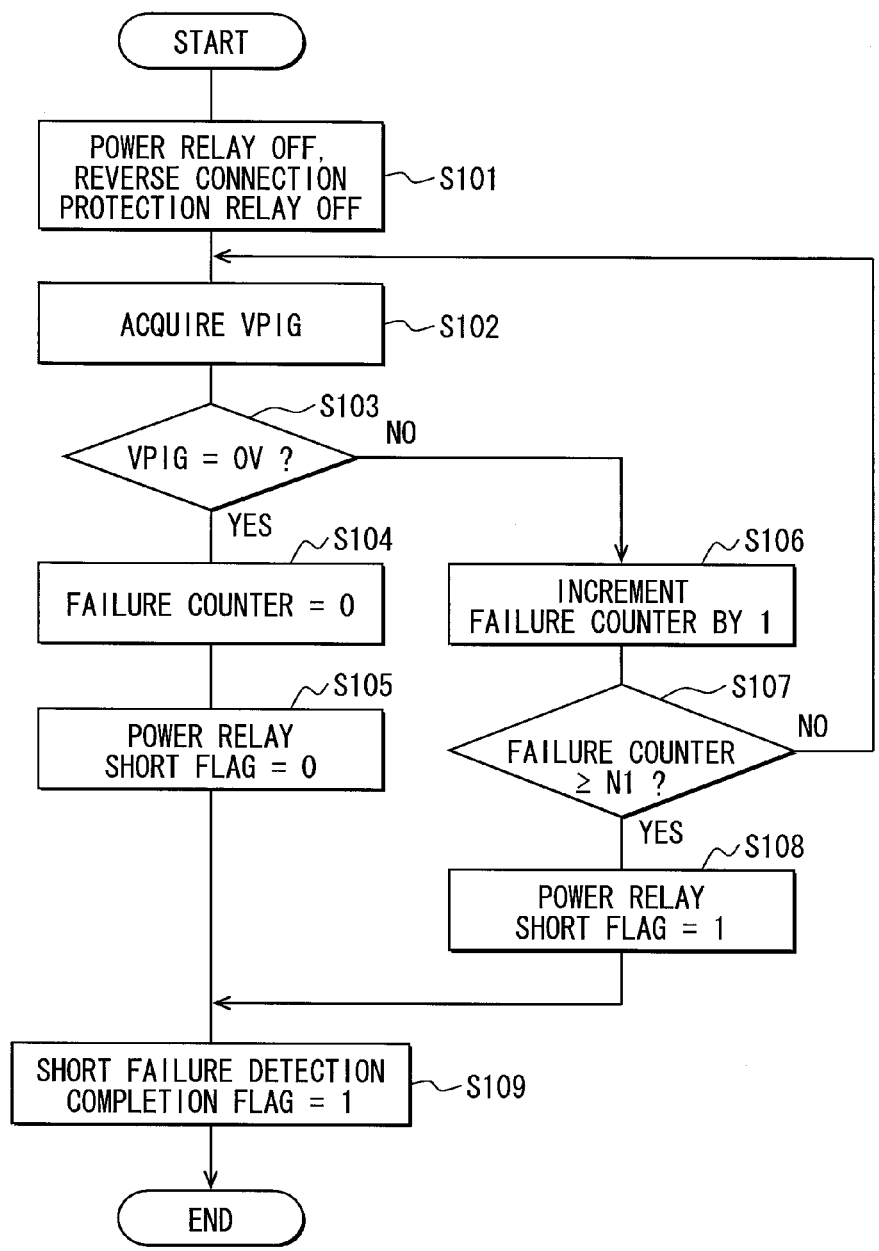
FIG. 3 is a flowchart of a power relay short failure detection process.
Figure 4:
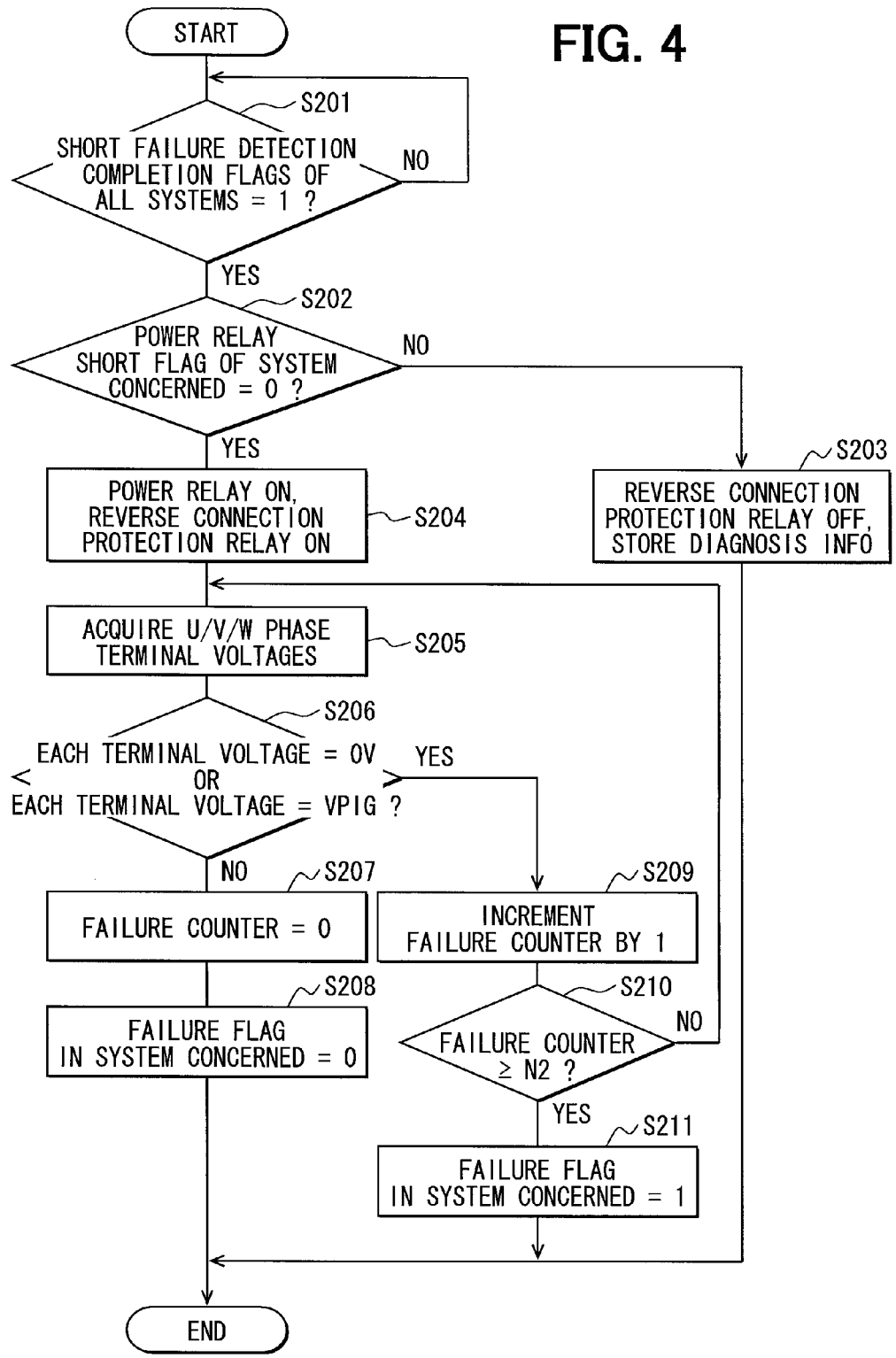
FIG. 4 is a flowchart of an inverter failure detection process.

With reference to FIG. 3 and FIG. 4, an initial failure diagnosis process of the present embodiment is described. The initial failure diagnosis process is performed by the control unit 60 prior to a start of operation of the electric power steering apparatus 1 when the ignition switch 55 is turned ON. Normally, when the ignition switch 55 is turned ON, all of MOS 21 to 26, 31 to 36, the power relays 41, 46, and the reverse connection protection relays 42, 47 are controlled to be in an OFF (open) state. Further, the initial failure diagnosis process is performed for each of the plural systems in parallel. In other words, the initial failure diagnosis process for the first system 100 and the initial failure diagnosis process for the second system 200 are performed in parallel with each other. Since the initial failure diagnosis process for the first system 100 and the initial failure diagnosis process for the second system 200 are similar to each other, the following description only describes the initial failure diagnosis process for the first system 100, and description of the same process for the second system 200 is not provided for brevity. Further, in the present embodiment, it is assumed that no failure is caused for the reverse connection protection relays 42, 47.

A power relay short failure detection process shown in FIG. 3 is performed. At S101, the control unit 60 turns OFF the power relay 41 and the reverse connection protection relays 42. At S102, the after-first-relay voltage VPIG1 is acquired.

At S103, the control unit 60 determines whether the after-first-relay voltage VPIG1 is equal to 0V. In this case, whether the voltage is equal to 0V means that the voltage may possibly be different from an exact value of 0V, but may be within a certain range close to 0V. The same applies to all other determinations of a threshold and the like regarding the failure detection. When the after-first-relay voltage VPIG1 is not equal to 0V (S103:NO), the control unit 60 proceeds to S106. When the after-first-relay voltage VPIG1 is equal to 0V (S103: YES), the control unit proceeds to S104.

At S104, the control unit 60 resets a failure counter. At S105, the control unit 60 resets a power relay short flag.

At S106, which comes after a determination that the after-first-relay voltage VPIG1 is not equal to 0V (S103: NO), the control unit 60 increments the failure counter.

At S107, the control unit 60 determines whether the failure counter is equal to or greater than a predetermined value N1. When the failure counter is smaller than the predetermined value N1 (S107:NO), the control unit 60 returns to S102. When the failure counter is equal to or greater than the predetermined value N1 (S107:YES), the control unit 60 proceeds to S108.

At S108, the control unit 60 determines that the first power relay 41 is having a short failure, and sets a first power relay short flag. Subsequently, at S109, which comes after S105 or S108, the control unit 60 sets a first power relay short failure detection completion flag, and finishes the process itself.

When the first power relay 41 does not have a short failure, the after-first-relay voltage VPIG1 becomes 0V in case that the first power relay 41 is controlled to be in an OFF (open) state. On the other hand, the after-first-relay voltage VPIG1 will have an equivalent value as the IG voltage VIG when the first power relay 41 has a short failure. Therefore, in the present embodiment, based on the detection value of the after-first-relay voltage VPIG1, a failure of the first power relay 41 (i.e., a short failure of the first power relay 41) is detected.

Further, when a state in which the after-first-relay voltage VPIG1 is not equal to 0V is detected for N1 times, which is a predetermined number, the control unit 60 determines such condition as the short failure of the first power relay 41. In such manner, a false determination of the short failure of the first power relay 41 is prevented. That is, for example, even when the after-first-relay voltage VPIG1 temporarily becomes 0V under influence of a sensor error and/or an external disturbance, it is not falsely determined as the short failure of the first power relay 41.

Further, as the short failure of the first power relay 41 described here is detected based on the after-first-relay voltage VPIG1, the short failure of the second power relay 46 is detected based on the after-second-relay voltage VPIG2 by a similar process.

With reference to FIG. 4, an inverter failure detection process is described, which is performed subsequent to the power relay short failure detection process shown in FIG. 3. The inverter failure detection process is also performed in parallel for each of the plurality of systems. The following description only describes the inverter failure detection process for the first system 100, and description of the same process for the second system 200 is not provided for brevity.

At S201, the control unit 60 determines whether a short failure detection completion flag is set for all of the systems. When the short failure detection completion flag is not set for all of the systems (S201:NO), the control unit 60 repeats this determination step. When the short failure detection completion flag is set for each of all systems (S201:YES), the control unit 60 proceeds to S202.

At S202, the control unit 60 determines whether the power relay short flag of the first system 100 (i.e., a system concerned) is set. When the power relay short flag of the first system 100 is not set (S202:YES), the control unit 60 proceeds to S204. When it the power relay short flag of the first system 100 is set (S202:NO), the control unit 60 proceeds to S203.

At S203, the control unit 60 stores diagnosis information that indicates that the first power relay 41, which is a power relay of the first system 100, has a short failure, and finishes the process itself. At such time, the first reverse connection protection relay 42 is kept OFF, i.e., the relay 42 will not be turned ON.

At S204, which come after a determination that the power relay short flag of the first system 100 is not set (S202:YES), the control unit 60 turns ON the first power relay 41 and the first reverse connection protection relay 42. Subsequently, the terminal voltages MVU1, MVV1, MVW1 are acquired at S205.

The control unit 60 determines whether each of the terminal voltages MVU1, MVV1, MVW1 is equal to 0V or equal to the after-first-relay voltage VPIG1 at S206. When each of the terminal voltages MVU1, MVV1, MVW1 is equal to 0V or equal to the after-first-relay voltage VPIG1 (S206:YES), the control unit 60 proceeds to S209. When each of the terminal voltages MVU1, MVV1, MVW1 is not equal to 0V and is not equal to the after-first-relay voltage VPIG1 (S206:NO), the control unit 60 proceeds to S207. Further, in case that the determination of S206 is negative, the U1 terminal voltage MVU1 satisfies a condition 0<MVU1<VPIG1, and the other terminal voltages MVV1, MVW1 satisfy similar conditions.

The control unit 60 resets the failure counter at S207 and resets the first system failure flag at S208, and then finishes the process of FIG. 4.

At S209, which comes after a determination that each of the terminal voltages MVU1, MVV1, MVW1 is equal to 0V or equal to the after-first-relay voltage VPIG1 (S206:YES), the control unit 60 increments the failure counter.

The control unit 60 determines whether the failure counter is equal to or greater than a predetermined value N2 at S210. When the failure counter is less than the predetermined value N2 (S210:NO), the control unit 60 returns to S205. When the failure counter is equal to or greater than the predetermined value N2 (S210:YES), the control unit 60 proceeds to S211.

The control unit 60 determines that the first inverter unit 20 or the first winding pair 17 has a failure and sets the first system failure flag at S211, and then finishes the process itself.

When focusing on the U phase of the first system 100, the U1 terminal voltage MVU1 becomes 0V in a case where the U2 coil 11 is short-circuited to a ground side or the U1 phase low-side MOS 24 has a short failure. Further, the U1 terminal voltage MVU1 has a value that is equivalent to the after-first-relay voltage VPIG1 when the U2 coil 11 is short-circuited to a first PIG line 501 side or the U1 phase high-side MOS 21 has a short failure. Based on the detection values of the terminal voltages MVU1, MVV1, MVW1 and the detection value of the after-first-relay voltage VPIG1, a failure of the first inverter unit 20 or a failure of the first winding pair 17 is detected. More practically, a failure of each phase of the first inverter unit 20 or a failure of each phase of the first winding pair 17 is detected.

Further, when it is determined that each of the terminal voltages MVU1, MVV1, MVW1 is equal to 0V or equal to the after-first-relay voltage VPIG1 for the predetermined N2 times, the control unit 60 determines that the inverter unit 20 or the first winding pair 17 has a short failure. In such manner, even when each of the terminal voltages MVU1, MVV1, MVW1 temporarily becomes 0V or the after-first-relay voltage VPIG1 under influence of a sensor error or an external disturbance, a false determination that the inverter unit 20 or the first winding pair 17 has a short failure is prevented.

A failure of the first inverter unit 20 and a failure of the first winding pair 17 described above are detected based on the U1 terminal voltage MVU1, the V1 terminal voltage MW1, the W1 terminal voltage MVW1, and the after-first-relay voltage VPIG1. A failure of the second inverter unit 30 and a failure of the second winding pair 18 are detected based on the U2 terminal voltage MVU2, the V2 terminal voltage MW2, the W2 terminal voltage MVW2, and the after-second-relay voltage VPIG2 by a similar process.

Accordingly to the power relay short failure detection process of FIG. 3, the time at which the inverter failure detection process of FIG. 4 is started will be different system to system when the number of negative determinations in S103 is different from system to system.

Based on an assumption that the first power relay 41 and the second power relay 46 do not have a short failure, a situation in which the power relay short failure detection process of FIG. 3 for the first system 100 has finished prior to the same process for the second system 200 is described in the following.

When the power relay short failure detection process of the first system 100 is finished, the first power relay 41 and the reverse connection protection relay 42 may be turned ON without waiting for an end of the failure detection process of the second system 200. In such a case, a power supply from the battery 50 to the first capacitor 44 through the first PIG line 501 is enabled for charging the first capacitor 44. At this point, if the first capacitor 44 is in a no charge state, a rush current flows into the first capacitor 44, which is caused by an electric potential difference of the after-first-relay voltage VPIG1 (i.e., a voltage substantially equal to a power supply voltage). An electric current value of the rush current is determined based on a wiring resistance and an inductance of a wire harness and the like from the battery 50, as well as a resistance and an inductance of the choke coil 52 that forms a filter circuit. When the electric charge is collected in the first capacitor 44 and an electric potential difference measured as a difference between the potential in the capacitor 44 and the after-first-relay voltage VPIG1 becomes smaller, the rush current becomes smaller.

In this case, it is further assumed that when the electric charge is collected in the first capacitor 44 to put the capacitor 44 in a full charge state, the power relay short failure detection process of the second system 200 is finished and the second power relay 46 and the second reverse connection protection relay 47 are turned ON.

As described above, an electric charge flows into the first capacitor 44 in the first system 100 for which the first power relay 41 is turned ON prior to the other system, through a path that has the resistance and the inductance regarding the wire harness from the battery 50 and the like as well as the choke coil 52. On the other hand, an electric charge flows into the second capacitor 49 in the second system 200 for which the second power relay 46 is turned ON later, through a path from the first capacitor 44, which has very little resistance and inductance. Therefore, the rush current to the second capacitor 49 is very large in comparison to the rush current to the first capacitor 44. In case that a semiconductor element, such as MOSFET, is used as the power relays 41, 46 and the reverse connection protection relays 42, 47, having such a large rush current may damage the semiconductor element due to an electric current value of the rush current exceeding a tolerance value, or due to heat generation of the substrate on which the power relays 41, 46 are implemented, or due to a burn out of the relays and/or the substrate. The same damage may be caused when the second power relay 46 and the second reverse connection protection relay 47 are turned ON first.

Therefore, in the present embodiment, the control unit 60 determines in S201 of FIG. 4, whether the short failure detection completion flags of all systems are set, or repeats such determination until such flag is set for all systems, so that the power relay 41, 46 will not be turned ON before the short failure detection completion flags of all systems are set. Thus, after waiting for the setting of the short failure detection completion flags of all systems, the reverse connection protection relays 42, 47 as well as the power relays 41, 46 are turned ON. In such manner, the power relays 41, 46 and the reverse connection protection relays 42, 47 are turned ON at substantially the same turn ON time. Accordingly, one of the two capacitors 44, 49 will not be charged prior to the other, thereby causing no large rush current flowing from one to the other of the two capacitors 44, 49 through a low impedance path.

Since the first inverter unit 20 and the second inverter unit 30 are provided in parallel, in case that the first power relay 41, the first reverse connection protection relay 42, the second power relay 46, and the second reverse connection protection relay 47 are turned ON substantially at the same time, the amount of the rush current flowing from the battery 50 into the first inverter unit 20 and into the second inverter unit 30 is reduced, in comparison to the case where one of the first power relay 41 or the second power relay 46 is turned ON first.

In such manner, the rush current transmitted to MOS 21 to 26, 31 to 36, the power relays 41, 46, and the reverse connection protection relays 42, 27 is reduced. Therefore, there is no need for the motor drive device to use a semiconductor element having a large source-drain electric current tolerance value (e.g., an expensive semiconductor element having a large chip size).

In case that the first power relay 41, the first reverse connection protection relay 42, the second power relay 46, and the second reverse connection protection relay 47 are turned ON substantially at the same time, a part of the circuit including the first inverter unit 20 and the second inverter unit 30 becomes a parallel equivalent circuit, and a resistance of such circuit is reduced. When the resistance is reduced, the rush current flowing into the first capacitor 44 and the second capacitor 49 increases. However, in the present embodiment, the resistance of the wiring from the battery 50 and the resistance of the choke coil 52 are about 3 to 5 times of the resistance of the inverter units 20, 30. Therefore, the influence of the rush current flowing into the capacitors 44, 49 by turning ON the power relays 41, 46 and the like is not so substantial.

When the first power relay 41 has a short failure, the first capacitor 44 is charged by a voltage that has a voltage drop of a path that includes (i) the first power relay 41 having the short failure and (ii) a parasitic diode of the first reverse connection protection relay 42 having an OFF state. The voltage drop described above is the voltage drop of the parasitic diode of the first reverse connection protection relay 42. In the present embodiment, the first reverse connection protection relay 42 will not be turned ON, i.e., the relay 42 is kept in the OFF state, when the first power relay 41 has a short failure (S202 of FIG. 4:NO). At such time, even when the second power relay 46 and the second reverse connection protection relay 47 are turned ON, due to the effect of the parasitic diode of the first reverse connection protection relay 42, no rush current flows from the first capacitor 44 in a charged state towards the second system 200 side (i.e., to the second capacitor 49, more practically).

When the second power relay 46 does not have a short failure, the second power relay 46 and the second reverse connection protection relay 47 are turned ON for performing a failure detection of the second inverter unit 30 and the second winding pair 18. In case no failure is detected, the motor 10 is driven by using the second system 200 only, and a steering assist of the steering wheel 91 is performed by the electric power steering apparatus 1.

The same applies to a case that the second power relay 46 has a short failure and the first power relay 41 has no short failure.

As fully described in the above, the motor drive device 2 for driving the motor 10 that has the plurality of winding pairs 17, 18 includes the inverter units 20, 30, the capacitors 44, 49, the power relays 41, 46, and the control unit 60. The inverter units 20, 30 are disposed in correspondence with the plurality of winding pairs 17, 18, and are connected to the battery 50 in parallel with each other. The capacitors 44, 49 are disposed in correspondence with the inverter units 20, 30. The power relays 41, 46 are disposed at a position between the battery 50 and the inverter units 20, 30, and are disposed in correspondence with the inverter units 20, 30. The control unit 60 has a drive control unit and a failure detection unit. The drive control unit controls drive of the inverter units 20, 30 and drive of the power relays 41, 46. Further, the failure detection unit detects a short failure of the power relays 41, 46 (S108 of FIG. 3). Further, the drive control unit simultaneously turns ON the power relays 41, 46 that do not have a short failure (S204 of FIG. 4).

In the present embodiment, the power relays 41, 46 that do not have a short failure are turned ON at the same time. Accordingly, some of the capacitors 44, 49, do not have an electric charge stored therein, and a large electric current does not flow from the capacitor 44, 49 to other systems through a low impedance path. Therefore, damage caused by such large electric current to the power relays 41, 46, the reverse connection protection relays 42, 47 or other electronic components of the motor drive device 2 is prevented.

Further, since the inverter units 20, 30 are connected to the battery 50 in parallel with each other, the rush current flowing from the power relays 41, 46 to the inverter units 20, 30 is reduced. In such manner, an inexpensive semiconductor element having a small chip size can be used as MOS 21 to 26, 31 to 36, the power relays 41, 46, and the reverse connection protection relays 42, 47. That is, the cost and the size of the motor drive device, especially of a control substrate having the inverter units 20, 30 and the like implemented thereon, may be reduced.

The motor drive device 2 of the present embodiment includes the reverse connection protection relays 42, 47, which is disposed between the power relays 41, 46 and the inverter units 20, 30. The drive of the reverse connection protection relays 42, 47 is controlled by the control unit 60. The power relays 41, 46 and the reverse connection protection relays 42, 47 are semiconductor elements that have a parasitic diode. Further the parasitic diode of the reverse connection protection relays 42, 47 are disposed reversely relative to a direction of the parasitic diodes of the power relays 41, 46.

Since the power relays 41, 46 and the reverse connection protection relays 42, 27 are implemented as semiconductor elements, those relays have a smaller volume than mechanical-contact type relays.

Further, the parasitic diode of the first power relay 41 and the parasitic diode of the first reverse connection protection relay 42 are disposed in opposite directions for intercepting the electric current flowing in both directions. Therefore, even when the polarity of the battery 50 that serves as a power supply and the polarity of the first capacitor 44 are misplaced to have a reverse direction, the electric circuit of the motor drive device 2 is protected. Similarly, the parasitic diode of the second power relay 46 and the parasitic diode of the second reverse connection protection relay 47 are disposed in opposite directions for intercepting the electric current flowing in both directions. Therefore, even when the polarity of the battery 50 that serves as a power supply and the polarity of the second capacitor 49 are misplaced to have a reverse direction, the electric circuit of the motor drive device 2 is protected.

When a part of the power relays 41, 46 has a short failure, the reverse connection protection relays 42, 47 that are disposed in correspondence with the power relays 42, 47 are turned OFF.

When the first power relay 41 has a short failure, the first reverse connection protection relay 42 is kept OFF (i.e., is not turned ON). Therefore, even when the second power relay 46 and the second reverse connection protection relay 47 are turned ON with the first capacitor 44 having a charged state, the large electric current is prevented from flowing from the first capacitor 44 to the second system 200 side due to the effect of the parasitic diode of the first reverse connection protection relay 42. Similarly, when the second power relay 46 has a short failure, the second reverse connection protection relay 47 is kept OFF (i.e., is not turned ON). Therefore, even when the first power relay 41 and the first reverse connection protection relay 42 are turned ON with the second capacitor 49 having a charged state, the large electric current is prevented from flowing from the second capacitor 49 to the second system 200 side due to the effect of the parasitic diode of the second reverse connection protection relay 47.

The electric power steering apparatus 1 of the present embodiment includes the motor 10 and the motor drive device 2. The motor 10 of the present embodiment is driven by the first system 100 and the second system 200. Further, when a failure occurs in the first system 100 or in the second system 200, the drive of the motor 10 is continued by turning OFF the failed system. In other words, the power relays 41, 46 and the reverse connection protection relays 42, 47 of the failed system are turned OFF, and the power supply to the non-failed system is continued. In such manner, even when one of the two systems has a failure, the drive of the motor 10 is continued by using the non-failed system, thereby enabling the continuation of the steering assist for the steering operation of the steering wheel 91 by using the electric power steering apparatus 1.

In the present embodiment, the control unit 60 serves as a "drive control unit" and a "failure detection unit." Further, S204 of FIG. 4 functions as a process performed by the "drive control unit", and S108 of the FIG. 3 functions as a process performed by the "failure detection unit."

(Modifications)

Although the present disclosure has been fully described in connection with the above embodiment thereof with reference to the accompanying drawings, it is to be noted that various changes and modifications will become apparent to those skilled in the art.

In the above embodiment, the motor and the motor drive device are described to have two systems. However, the number of systems may be three or more. For example, when the first system and the second system are for a normal use and the third system is for a backup use, the power relays of the first and second systems may be simultaneously turned ON and the power relay of the third system may be kept from being turned ON. In other words, while the power relay of a system that is not normally used may be kept from being turned ON, the power relays of the systems that are used for the drive of the motor may exclusively be turned ON.

That is, for example, during a period between a turning ON of an ignition switch and a turning OFF of the ignition switch, if the motor drive device is in a state in which the power relay of a part of many systems is turned ON first to have the capacitor of the turned-ON system being charged, only the power relays that should be turned ON may be turned ON, as long as the power relays in the rest of the many systems will not be turned ON.

In the above embodiment, it is assumed that the reverse connection protection relay does not have a short failure. However, the control unit may acquire a voltage between the power relay and the reverse connection protection relay, and a failure of the reverse connection protection relay may be detected based on the acquired voltage. The failure detection process for detecting a failure of the reverse connection protection relay may preferably be performed between the power relay short failure detection process and the inverter failure detection process.

Further, a detection method for detecting a short failure and a control method for controlling the motor drive device may be any method, as long as the power relays that should be turned ON are configured to be simultaneously turned ON after detection of the short failure of the power relay.

In the above embodiment, MOSFET is used as a switching element of the inverter unit, a motor relay, a power relay, and a reverse connection protection relay. However, other semiconductor elements, such as the mechanical-contact type relay, may be used as the same components. Further, a switching element of the inverter unit, a motor relay, a power relay, and a reverse connection protection relay may be implemented as different semiconductor elements and/or relays. In such a case, the parasitic diode parasitic on the semiconductor element may be a diode, but may also be a thyristor or the like.

Further, though, in the above embodiment, three capacitors are provided for each of the systems, the number of capacitors in one system may be arbitrarily determined.

In the above embodiment, the motor drive device is applied to an electric power steering apparatus. However, the motor drive device may be applied to other apparatuses other than the electric power steering apparatus.

Such changes and modifications are to be understood as being within the scope of the present disclosure as defined by the appended claims.

What is claimed is:

1. A motor drive device for driving a motor, which has a plurality of winding pairs, the motor drive device comprising:
    a plurality of inverter units for the plurality of winding pairs, the plurality of inverter units coupled to a power supply in parallel to each other;
    a plurality of capacitors coupled to the plurality of inverter units;
    a plurality of power relays disposed between the power supply and the plurality of inverter units;
    a choke coil disposed between the power supply and the plurality of power relays; and
    a control unit having a drive control unit and a failure detection unit, the driver control unit controlling a drive of the inverter units and a drive of the power relays, and the failure detection unit detecting a short failure of the power relays, wherein the drive control unit simultaneously turns ON the power relays that are detected by the failure detection unit as not having the short failure,
    wherein a resistance of a wiring between a battery and a choke coil is about three to five times of a resistance of the plurality of inverter units.

2. The motor drive device of claim 1 further comprising:
    a plurality of reverse connection protection relays disposed between the power relay and the plurality of inverter units, wherein
    the drive control unit controls the drive of the reverse connection protection relays,
    the power relay and the reverse connection protection relay are semiconductor elements having a parasitic diode, and
    the parasitic diode of the reverse connection protection relay is disposed in an opposite direction relative to a direction of the parasitic diode of the power relay.

3. The motor drive device of claim 2, wherein
    the drive control unit turns OFF the reverse connection protection relay provided for the power relay that is detected by the failure detection unit as having the short failure.

4. The motor drive device of claim 1 disposed in an electric power steering apparatus.

5. The motor drive device of claim 1, wherein the resistance of the wiring between the battery and the choke coil is about three to five times of the resistance of the plurality of inverter units, when the plurality of power relays are turned ON substantially at a same time.

* * * * *